United States Patent [19]
Uno

[11] Patent Number: 6,159,334
[45] Date of Patent: Dec. 12, 2000

[54] DEVICE FOR ADHERING PROTECTIVE FILM ONTO PERSONAL DATA RECORDING SURFACE OF IDENTIFICATION BOOKLET

[76] Inventor: Tadao Uno, 1-84, Matsugaoka 1-chome, Chigasaki-shi, Kanagawa-ken, Japan

[21] Appl. No.: 09/153,067

[22] Filed: Sep. 15, 1998

[30] Foreign Application Priority Data

Jun. 26, 1998 [JP] Japan ................................. 10-180971

[51] Int. Cl.⁷ ...................................................... B30B 5/06
[52] U.S. Cl. ...................... 156/583.5; 156/555; 156/498; 100/154; 425/371
[58] Field of Search .............................. 156/555, 583.1, 156/583.5, 498; 100/151, 154; 425/371

[56] References Cited

U.S. PATENT DOCUMENTS

| | | | |
|---|---|---|---|
| 3,300,365 | 1/1967 | Roos | 156/583.5 X |
| 4,406,719 | 9/1983 | Mitsumoto et al. | 156/52 |
| 4,659,425 | 4/1987 | Eggers et al. | 156/630 |
| 4,670,080 | 6/1987 | Schwarz et al. | 156/307.5 |
| 4,824,354 | 4/1989 | Keaton | 425/345 |

*Primary Examiner*—James Sells
*Attorney, Agent, or Firm*—Wenderoth, Lind & Ponack, L.L.P.

[57] ABSTRACT

A device for adhering a protective film to a personal data recording surface of an individual identification booklet comprising a heat press board and a pressure receiving board disposed in vertically opposed relationship, an upper and a lower belt disposed between opposing surfaces of the heat press board and the pressure receiving board, and a booklet transfer mechanism interposed between opposing surfaces of the upper and lower belts and adapted to intermittently transfer an identification booklet. The upper and lower belts and the identification booklet interposed between the upper and lower belts are heated while being held under pressure between the opposing surfaces of the heat press board and the pressure receiving board so that the protective film bound into the identification booklet is thermally adhered to the personal data recording surface when the book transfer mechanism stops transferring of the identification booklet.

21 Claims, 7 Drawing Sheets

DEVICE FOR ADHERING PROTECTIVE FILM ONTO PERSONAL DATA RECORDING SURFACE OF IDENTIFICATION BOOKLET

BACKGROUND OF THE INVENTION

This invention relates to a device for adhering a protective film, which is bound into an identification booklet, to a personal data recording surface of the identification booklet after personal data are recorded on a data sheet of the identification booklet.

Figure 1A:
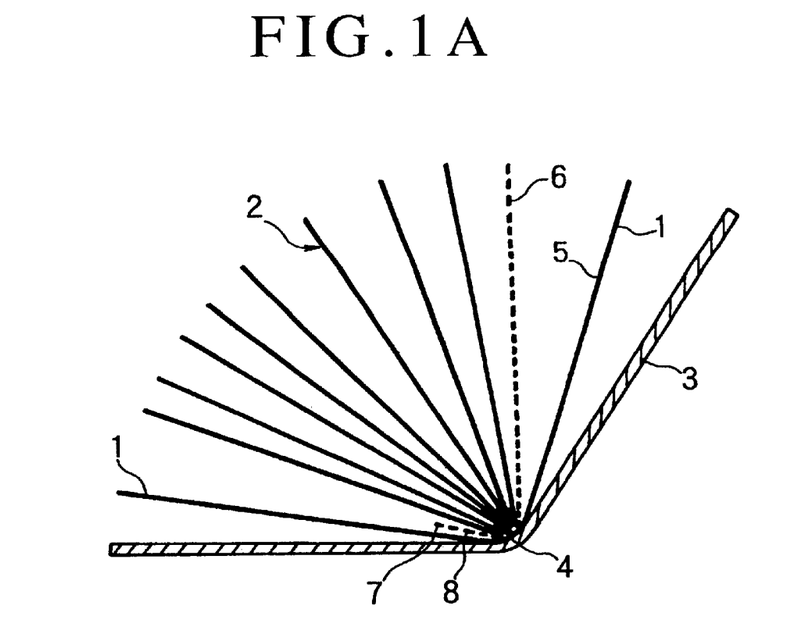
FIG. 1(A) is a sectional view of a virgin identification booklet in common with the prior art and the present invention and FIG. 1(B) is a sectional view of the identification booklet after a conventional protective film is thermally adhered thereto.
Figure 1B:
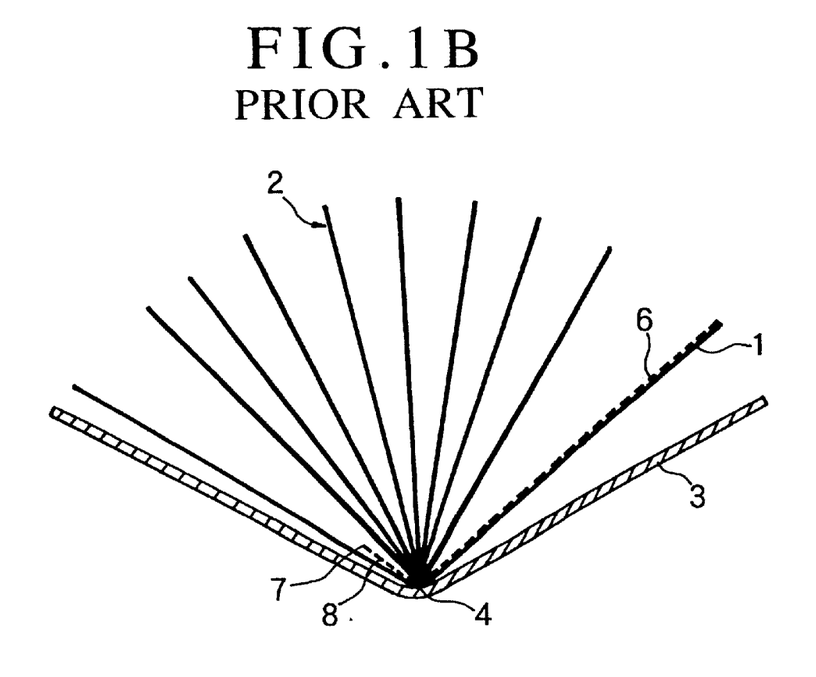

An identification booklet, for example, a passport, includes, as shown in FIG. 1(B) a data sheet 1, visa sheets 2, a cover 3 and the like which are gathered together and stitched along a central fold line by a sewing machine. Reference numeral 4 denotes the stitched portion. On a surface of the data sheet 1, there are recorded personal data. A thermoplastic protective film 6 made of synthetic resin is adhered to the personal data recording surface 5, so that the personal data recording surface 5 is guarded so as not to be counterfeited.

As best shown in FIG. 1(A), the protective film 6 in a virgin identification booklet is bound together with the data sheet 1, the visa sheets 2, the cover 3 and the like by the stitched portion 4 through a binding width 8 which is continuous with one end edge of the protective film 6. However, the protective film 6 is not adhered to the data sheet 1 so that personal data can be recorded on the data sheet 1.

After the personal data is recorded on the data sheet 1, the protective film 6 is superimposed on the personal data recording surface 5 and thermally welded. The protective film 6 is thermally welded to the personal data recording surface 5 in such a manner as to cover the entire surface of the personal data recording surface 5 (personal data recording page) but the binding width 8 is spaced apart from the stitched portion 4 and expanded towards the opposite side.

In a conventional identification booklet of the type as mentioned above, the binding width 8 of the protective film 6 is mostly expanded from the stitched portion 4 towards the opposite side and the expanded portion 7 is spaced part from and not adhered to other sheets. This spaced-apart expanded portion 7 allows for easy counterfeiting of the identification booklet.

Also, the protective film 6 in the conventional identification booklet tends to not be adhered at the stitched portion 4 including the area proximate to the stitched portion 4.

For example, when the protective film 6 is attempted to be thermally welded to the personal data recording surface 5 by passing the identification booklet between hot press rollers as in the conventional manner, slippage tends to occur between the protective film 6 and the data sheet 1. In addition, since sufficient heat is not applied to the stitched portion 4 and the expanded portion 7 in the identification booklet, the stitched portion 4 and the expanded portion 7 are not adhered together.

Also, in case the identification booklet is passed through the hot rollers, there is a fear that curling of the protective film will occur along with slippage of the protective film. In addition, since the protective film is significantly contracted after it is thermally adhered, the curling of the protective film is more likely to occur. Moreover, the curling of the protective film causes irregularities of the fore-edges of the data sheet and other sheets.

The present invention has been accomplished in view of the abovementioned inconveniences inherent in the conventional devices.

SUMMARY OF THE INVENTION

It is, therefore, an object of the present invention to provide a device for adhering a protective film to a personal data recording surface in an identification booklet.

To achieve the above object, there is essentially provided a device for adhering a protective film to a personal data recording surface of an individual identification booklet comprising a heat press board and a pressure receiving board disposed in vertically opposed relationship, an upper and a lower belt disposed between opposing surfaces of the heat press board and the pressure receiving board, and booklet transfer mechanism interposed between opposing surfaces of the upper and lower belts and adapted to intermittently transfer an identification booklet. The upper and lower belts and the identification booklet interposed between the upper and lower belts are heated while being held under pressure between the opposing surfaces of the heat press board and the pressure receiving board so that the protective film bound into the identification booklet is thermally adhered to the personal data recording surface when the book transfer mechanism stops transferring of the identification booklet.

It is preferred that a cool press device for holding under pressure the identification booklet in order to cool the protective film and an adhering surface thereof is disposed on an outlet side of the heat press device comprising the heat press board and the pressure receiving board.

It is also preferred that the heat press board constitutes a hot plate for heating an entire surface of the identification booklet through the upper belt, and the pressure receiving board includes a hot plate for heating a surface portion adjacent to a spine of the identification booklet through the lower belt.

It is also preferred that the booklet transfer mechanism comprises a plurality of bar pushers extending in a direction orthogonal to the booklet transferring direction and spacedly juxtaposed in the booklet transferring direction, and that the bar pushers are arranged such that each of the bar pushers pushes a rear end face of the identification booklet to transfer the identification booklet while being interposed between the upper and lower belts.

It is also preferred that each of the bar pushers has a flattened configuration capable of pushing a rear end face of the identification booklet at a level not exceeding a thickness of the identification booklet.

It is also preferred that each of the bar pushers for pushing a rear end face of the identification booklet includes a recess for receiving therein a rear end of the identification booklet.

It is also preferred that a rearward bar pusher of the bar pushers, which are adjacent forwardly and rearwardly, pushes a rear end face of the identification booklet and a forward bar pusher restricts a forward end face of the identification booklet.

It is also preferred that the rearward bar pusher includes a recess for receiving therein a rear end of the identification booklet and the forward bar pusher includes a recess for receiving therein a forward end face of the identification booklet.

It is also preferred that each of the bar pushers is formed by blanking a plate such that a rear end face of the identification booklet is pushed by a thickness-wise surface of the plate.

It is also preferred that each of the bar pushers pushes a top edge or a bottom edge of the identification booklet.

A more complete application of the present invention and many of the attendant advantages thereof will be readily recognized as the same becomes better understood by reference to the following detailed description when considered in connection with the accompanying drawings.

DETAILED DESCRIPTION OF THE EMBODIMENT

One embodiment of the present invention will now be described in detail with reference to FIGS. 2 to 9.

Figure 3:
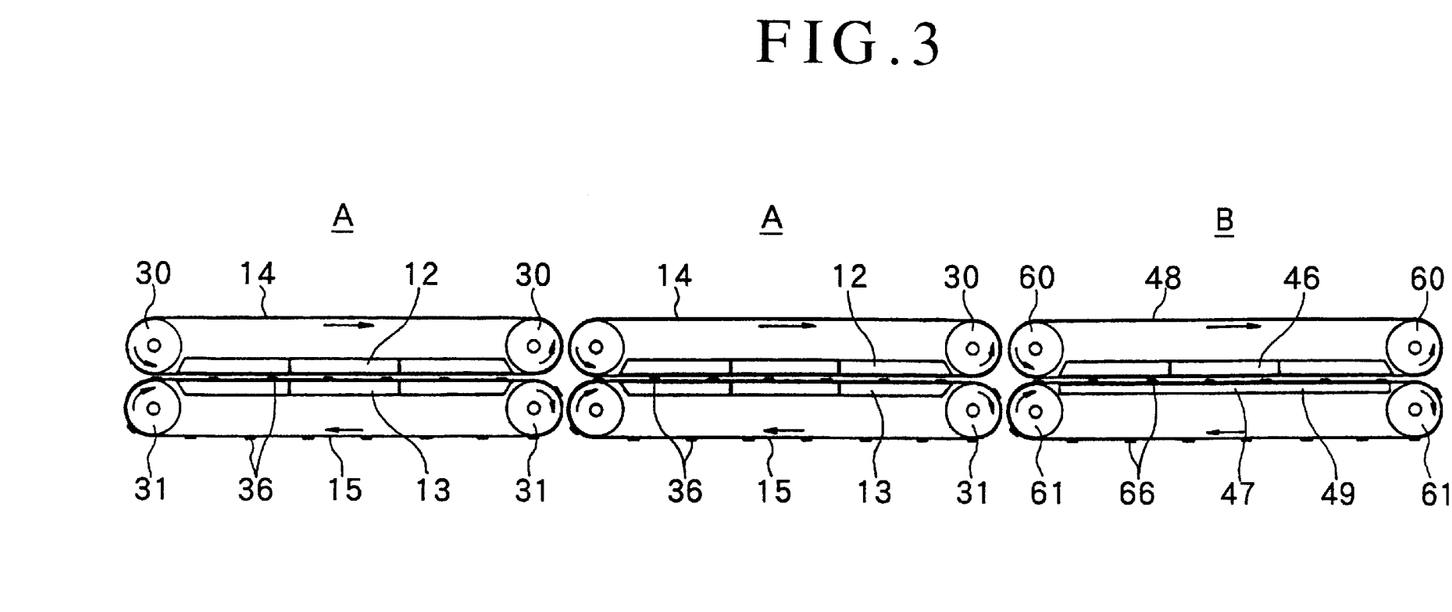
FIG. 3 is a side view of a device for adhering a protective film to a personal data recording surface of an identification booklet.
Figure 4A:
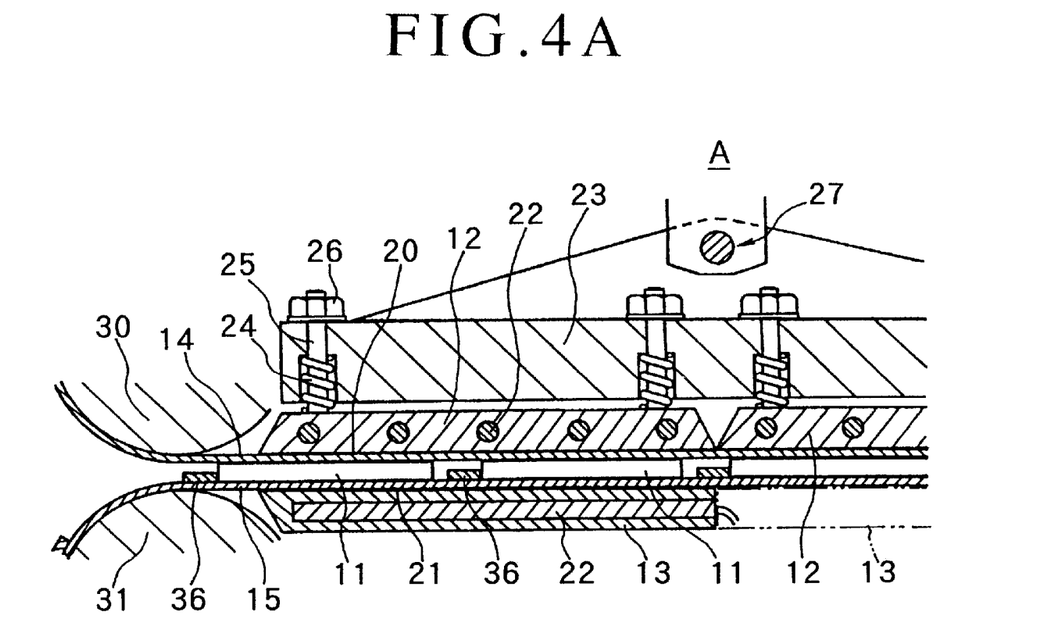
FIG. 4(A) is an enlarged side sectional view of a heat press device constituting the above device.
Figure 5A:
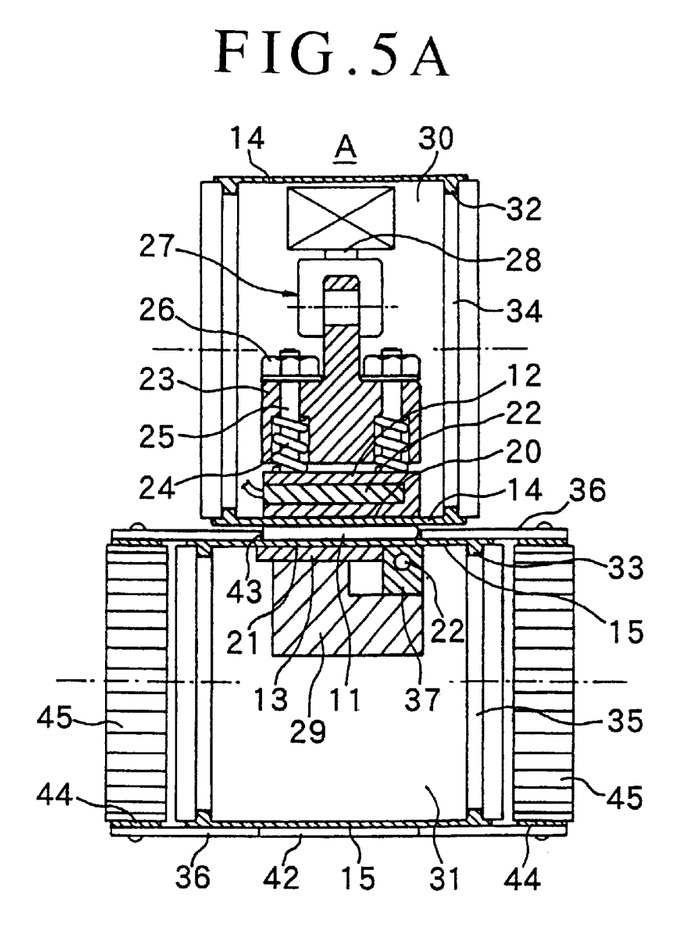
FIG. 5(A) is a front sectional view of the heat press device constituting the above device.

A heat press device A includes a heat press board 12 and a pressure receiving board 13 disposed in vertically opposed relationship, and an upper belt 14 and a lower belt 15 disposed between opposing surfaces of the heat press board 12 and the pressure receiving board 13.

It further includes booklet transfer mechanism interposed between opposing surfaces of the upper and lower belts 14, 15 and adapted to intermittently transfer an identification booklet 11.

The upper and lower belts 14, 15 and the identification booklet 11 interposed between the upper and lower belts 14, 15 are heated while being held under pressure between the opposing surfaces of the heat press board 12 and the pressure receiving board 13 so that a protective film 6 bound into the identification booklet 11 is thermally adhered to a personal data recording surface 5 of the identification booklet 11 when the book transfer mechanism stops transferring of the identification booklet 11. This protective film 6 is formed of a thermoplastic resin film.

As described above, the identification booklet 11 is heat pressed in its closed state, and the protective film 6 is heated by the heat from the heat press board 12 through the upper belt 14 and a back cover 19 or a front cover 18 and thermally adhered to the personal data recording surface 5 to cover the recording surface 5. The personal data can be seen through the transparent or semitransparent protective film 6.

The upper and lower belts 14, 15 retain the heat from the heat press board 12 and apply the heat to the protective film 6 from the outer surface side of the back cover 19 and the front cover 18.

The heat press board 12 and the pressure receiving board 13 are made of metal. Opposing surfaces of the heat press board 12 and the pressure receiving board 13, i.e., a pressing surface 20 of the heat press board 12 and a pressure receiving surface 21 of the pressure receiving board 13 are in the form of flattened surface, and the pressing surface 20 and the pressure receiving surface 21 are in opposed parallel relationship.

Figure 7:
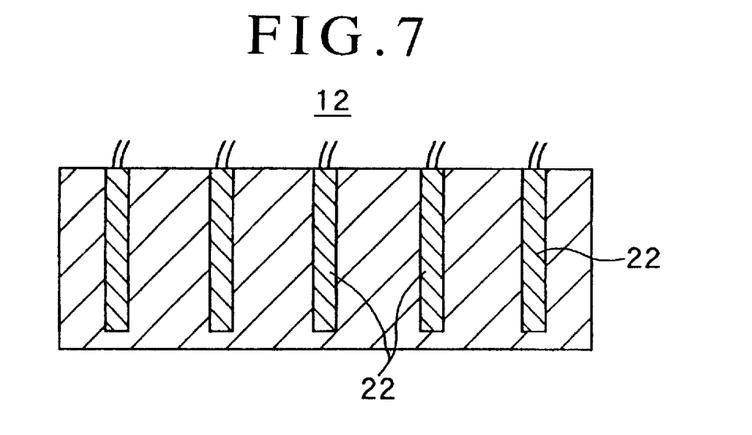
FIG. 7 is a top sectional view of a heat press board.

The heat press board 12 and the pressure receiving board 13 are dimensioned in length as being capable of hot pressing a plurality of identification booklets 11 at a time. The heat press board 12 is provided therein with a plurality of bar heaters 22 in a longitudinal direction (transferring direction) thereof. The heater bars 22 can be inserted and withdrawn sideways of the heat press board 12.

The heat press board 12 is disposed on a lower surface side of an upper base 23 through a cushion spring 24. For example, the cushion spring 24 is interposed between the heat press board 12 and the upper base 23, and a suspension bar 25 provided on the heat press board 12 is inserted into the upper base 23 from a lower surface side thereof towards an upper surface side thereof. Then, a nut 26 is threadingly engaged with a male screw formed on one end portion of the suspension bar 25 projecting from the upper surface side of the upper base 23 and tightened together, so that the cushion spring 24 is suspended in its compressed state. Accordingly, a repulsive force of the cushion spring 24 is normally exerted to the heat press board 12. This makes it possible for the heat press board 12 to resiliently move upwardly and downwardly.

It is also an interesting arrangement that the upper base 23 is suspended on an air cylinder 28 through a link 27, so that the heat press board 12 can be moved upwardly and downwardly together with the upper base 23 in accordance with expansion and contraction of the air cylinder 28.

On the other hand, the pressure receiving board 13 is fixedly attached onto the lower base 29 with the upper belt 14 and the lower belt 15 extending between the opposing surfaces of the heat press board 12 and the pressure receiving board 13.

The upper and lower belts 14, 15 are belts with ends or endless belts as illustrated. The upper belt 14 formed of an endless belt is disposed between upper rollers 30 which are arranged on an inlet side end portion and an outlet side end portion of the heat press board 12 in such a manner as to surround the heat press board 12.

Similarly, the lower belt 15 formed of an endless belt is disposed between lower rollers 31 which are arranged on an inlet side end portion and an outlet side end portion of the pressure receiving board 13 in such a manner as to surround the pressure receiving board 13.

Between the upper and lower rollers 30, 31, the upper and lower belts 14, 15 extend in parallel relation between the opposing surfaces of the heat press board 12 and the pressure receiving board 13. That is, the upper belt 14 extends along the pressing surface 20 of the heat pressing board 12, and the lower belt 15 extends along the pressure receiving surface 21 of the pressure receiving board 13.

Preferably, the upper belt 14 and the lower belt 15 are formed of a thick fabric woven from Teflon fiber so that they may have sufficient strength, heat resisting properties and heat accumulating properties.

Annular belt guiding ribs 32, 33 are provided on inner surface sides of ear portions of the upper and lower belts 14, 15. The annular ribs 32, 33 are fitted into annular grooves 34, 35 formed in the upper and lower rollers 30, 31 in order to prevent the upper and lower belts 14, 15 from swaying sideways.

The upper and lower belts 14, 15 are intermittently advanced by actuating one of the upper rollers 30 and one of the lower rollers 31. The upper and lower belts 14, 15 and bar pushers 36 acting as means for intermittently transmitting the identification booklet 11 as later described are intermittently driven generally in synchronism.

Figure 6:
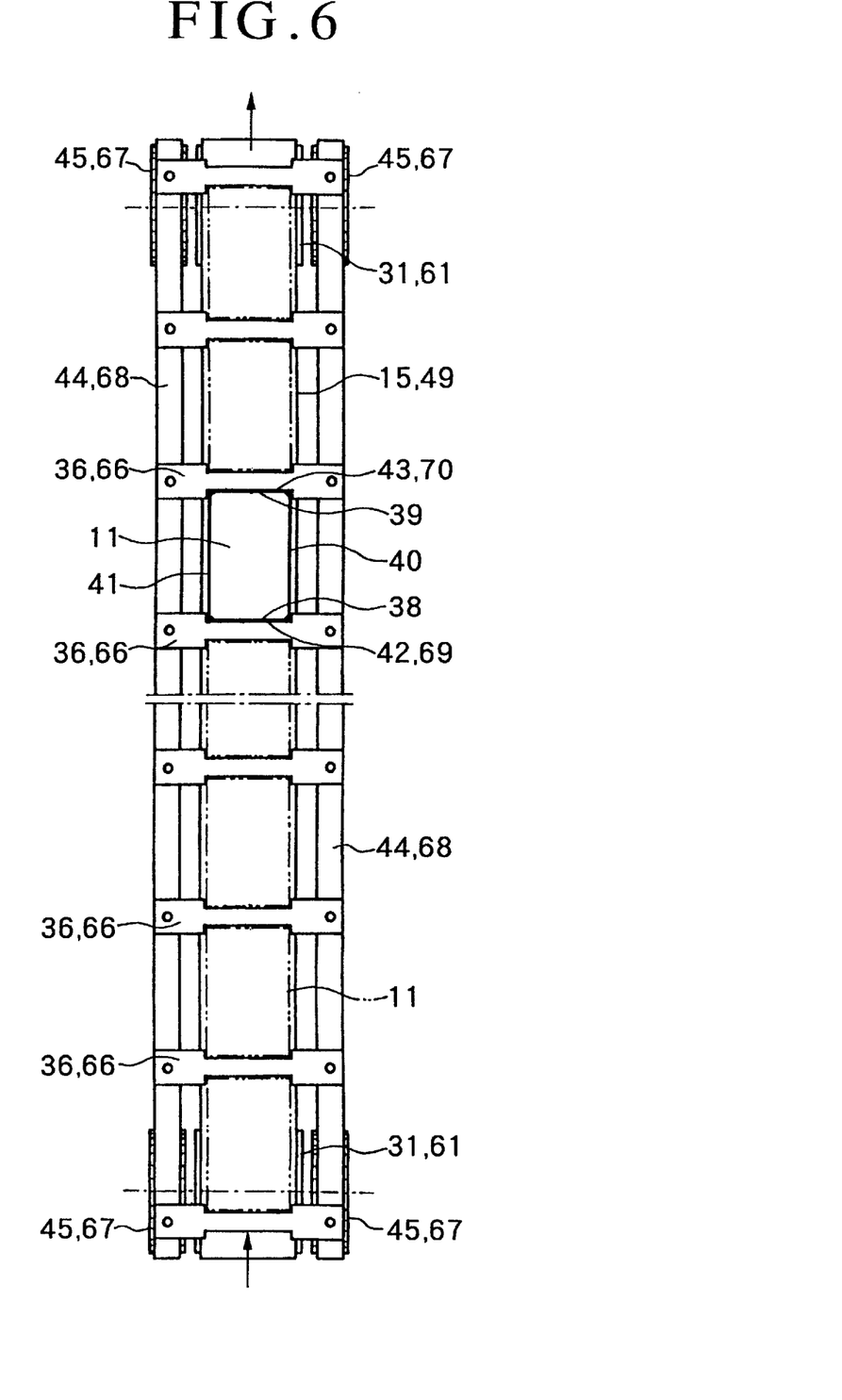
FIG. 6 is a plan view of a booklet transfer mechanism constituting the above device.

There is a provision of a booklet transfer mechanism for intermittently transferring the identification booklet 11 while interposing the identification booklet 11 between the upper and lower belts 14, 15.

The heat press board 12 is a hot plate for heating the entire surface of the back cover 19 or the front cover 18 of the identification booklet 11. On the other hand, the pressure receiving board 13 is provided with a binding width heating hot plate 37 for heating the outer surface portion of the front cover 18 or the back cover 19 adjacent to the spine 40 of the identification booklet 11 through the lower belt 15. That is, there is a provision of the binding width heating hot plate 37 for heating the binding width 8 of the protective film 6 at the area along the stitching portion 4 from the opposite side of the heat press board 12.

Figure 2A:
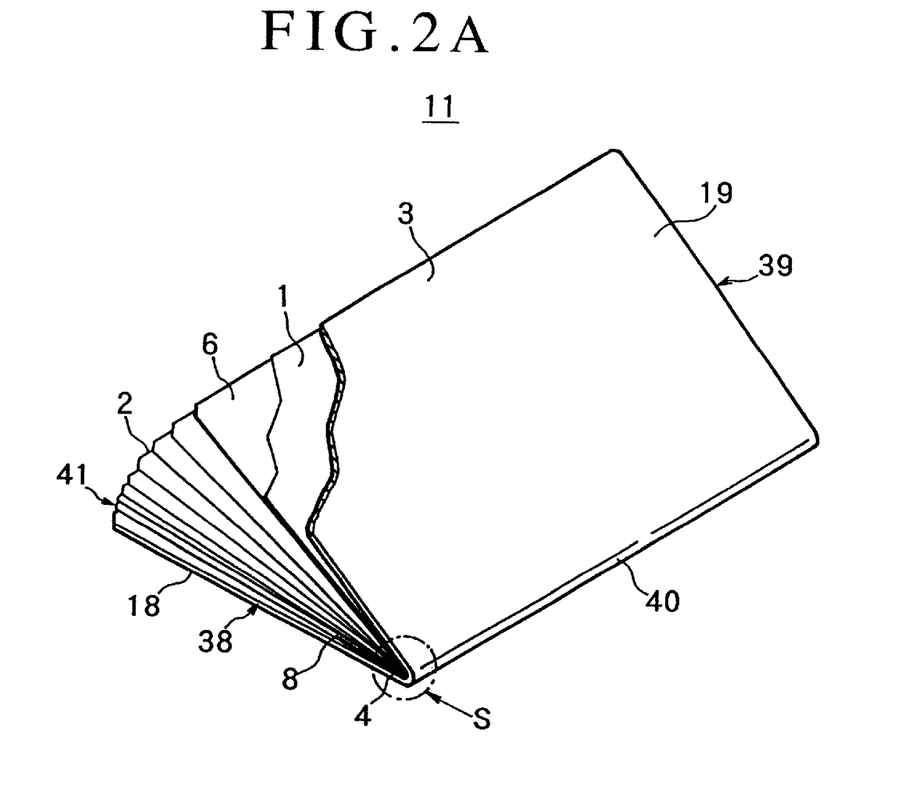
FIG. 2(A) is a perspective view, partly cutaway, of an identification booklet after a protective film is thermally adhered thereto according to the present invention.
Figure 2B:
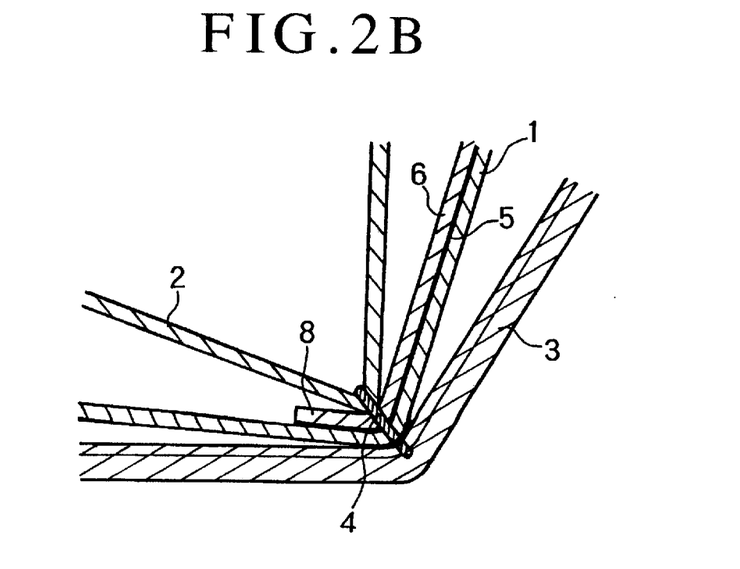
FIG. 2(B) is an enlarged sectional view of a portion of the booklet identified by "S" in FIG. 2(A) when viewed in a direction as indicated by an arrow of FIG. 2(A)

Accordingly, this binding width heating hot plate 37 is placed opposite to a part of the heat press board 12 and operated to hot press the area along the stitching portion 4 of the identification booklet 11, i.e., the extension area of the binding width 8 while holding that area from above and under the identification booklet 11. Thus, as shown in FIGS. 2(A) and 2(B), the protective film 6 is thermally adhered to the entire surface of the data recording surface 5 of the data sheet 1. At the same time, the binding width 8 of the protective film 6 is thermally adhered over the throat portion of the data sheet 1 including the stitching portion 4.

Accordingly, the bar pushers 36 to be described hereinafter transfer the identification booklet 11 while pushing the bottom margin 38 or the top margin 39 of the identification booklet 11. That is, the identification booklet 11 is pushed by the bar pushers 36 so as to be intermittently transferred with the top margin 39 or the bottom margin 38 extending in the direction orthogonal to the transferring direction of the identification booklet 11 and with the spine 40 and the front edge 41 extending in the transferring direction, and heat pressed by the heat press device A.

Figure 9:
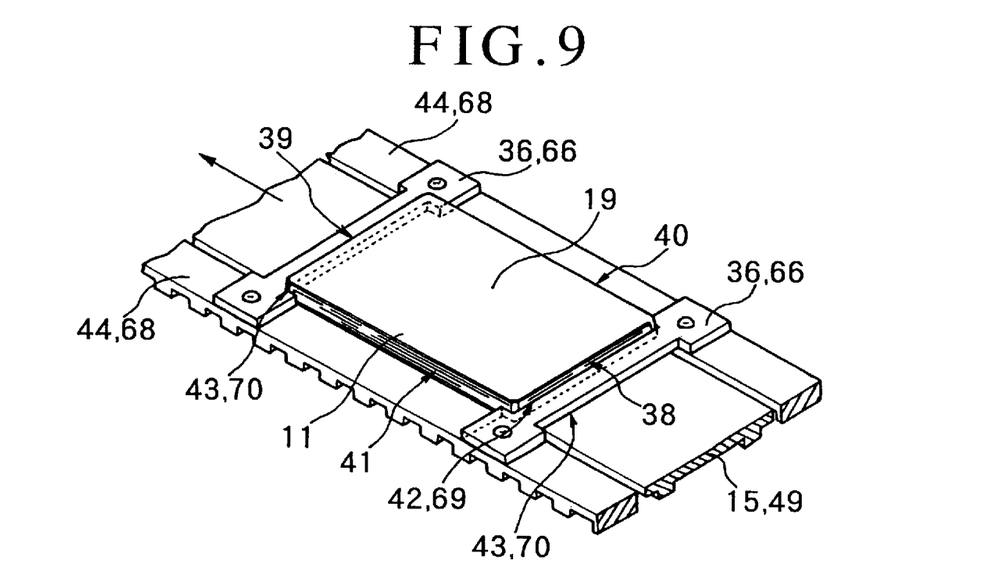
FIG. 9 is a perspective view of a bar pusher.

The device of the present invention includes, as the booklet transfer mechanism, a plurality of the bar pushers 36 extending in a direction orthogonal to the booklet transferring direction and spacedly juxtaposed in the booklet transferring direction. The bar pushers 36 are arranged such that each of the bar pushers 36 pushes a rear end face of the identification booklet 11, i.e., the bottom margin 38 or the top margin 39 of the identification booklet 11, to intermittently transfer the identification booklet 11 while being interposed between the upper and lower belts 14, 15.

Each of the bar pushers 36 has a flattened configuration capable of pushing a rear end face (for example, bottom margin 38) of the identification booklet 11, at a level not exceeding a thickness of the identification booklet 11.

Each of the bar pushers 36 for pushing a rear end face of the identification booklet 11 includes at its front edge a recess for receiving therein a rear end (bottom margin 38) of the identification booklet 11.

It is preferred that a rearward bar pusher 36 of the bar pushers 36, which are adjacent forwardly and rearwardly, pushes a rear end face of the identification booklet 11 and a forward bar pusher 36 restricts a forward end face of the identification booklet 11.

As one suitable example, the rearward bar pusher 36 includes, at its front edge, a recess 42 for receiving therein a rear end of the identification booklet 11 and the forward bar pusher 36 includes, at its rear edge, a recess 43 for receiving therein a forward end face of the identification booklet 11.

Accordingly, each of the bar pushers 36 includes at its front edge the recess 42 extending from one end to the other end thereof and at its rear edge the recess 43 extending from one end to the other end thereof The recesses 42, 43 receive therein the rear end portion (bottom margin 38) and the front end portion (top margin 39) of the identification booklet 11 so as to restrict the position of the booklet 11 with their inner wall surfaces. By this, the identification booklet 11 is effectively prevented from being inclined during the transferring operation of the identification booklet 11.

Each of the bar pushers 36 preferably has a flattened configuration capable of pushing a rear end face of the identification booklet 11, at a level not exceeding a thickness of the identification booklet 11. As one suitable example, each of the bar pushers 36 is formed by blanking a plate which is thinner than the identification booklet 11, and the upper and lower belts 14, 15 are superimposed on the plate surface with the thickness-wise surface of the plate oriented in the transferring direction of the identification booklet 11 such that a rear end face of the identification booklet 11 is pushed by a thickness-wise surface of the plate.

That is, a lower portion of the rear end face of the leading identification booklet 11 is pushed by the front edge (thickness-wise surface of the plate) of the bar pusher 36 and a lower end portion of the front end face of the following identification booklet 11 is restricted by the rear edge (thickness-wise surface of the plate) of the bar pusher 36.

Owing to the above arrangement, a stepped portion is formed between the bar pusher 36 and the identification booklet 11 such that the former is lower than the latter. Thus, the identification booklet 11 is properly sandwiched between the upper and lower belts 14, 15 and the identification booklet 11 is positively pressed and heated by the heat press device A through the upper and lower belts 14, 15.

As means for intermittently actuating the bar pushers 36, there is a provision of one pair of timing belts 44 traveling together with the lower belt 15 along the left and right sides of the lower belt 15. The bar pushers 36 are disposed between the timing belts 44 with opposite ends firmly secured to the timing belts 44.

The timing belts 44 are disposed between pulleys 45 provided on the inlet side end portion and the outlet side end portion of the pressure receiving board 13 so as to be transferred endlessly.

Preferably, the pulleys 45 are coaxially provided on opposite ends of the lower rollers 31, so that the timing belts 44 travel along generally the same orbit as the lower belt 15.

Figure 4B:
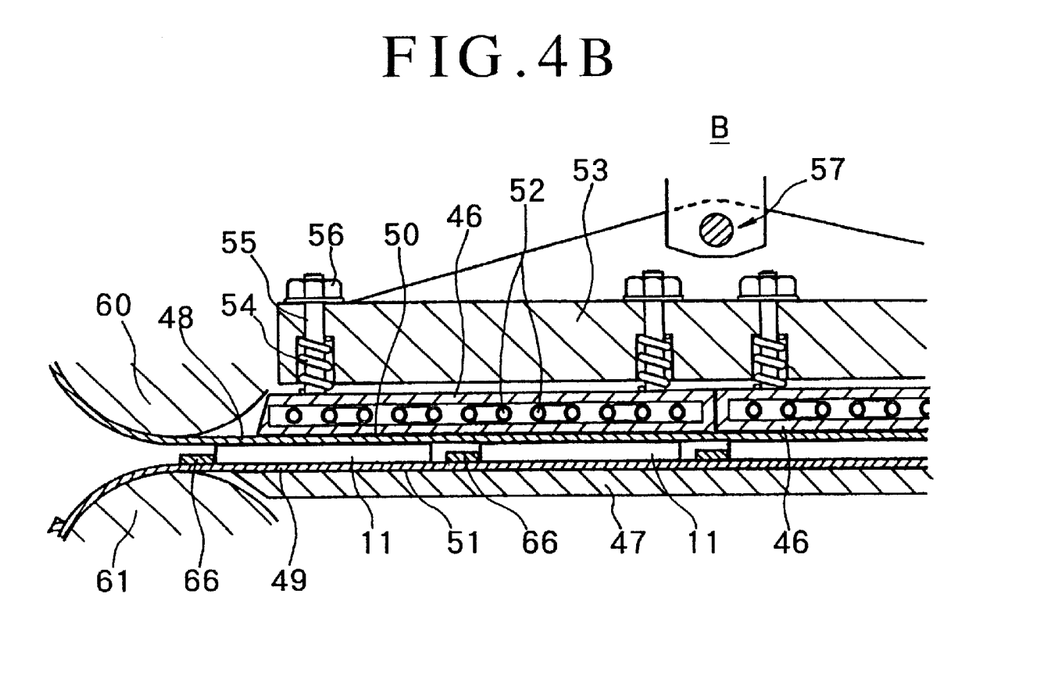
FIG. 4(B) is a side sectional view of a cool press device constituting the above device when viewed in a direction of a front thereof.

On the outlet side of the heat press device A comprising the heat press board 12 and the pressure receiving board 13, there is a provision of a cool press device B for holding under pressure the identification booklet 11 so as to cool the protective film 6 and its adhering surface.

The cool press device B is basically generally the same in construction as the heat press device A except that the heat press board 12 of the heat press device A is replaced by a hot plate.

Figure 5B:
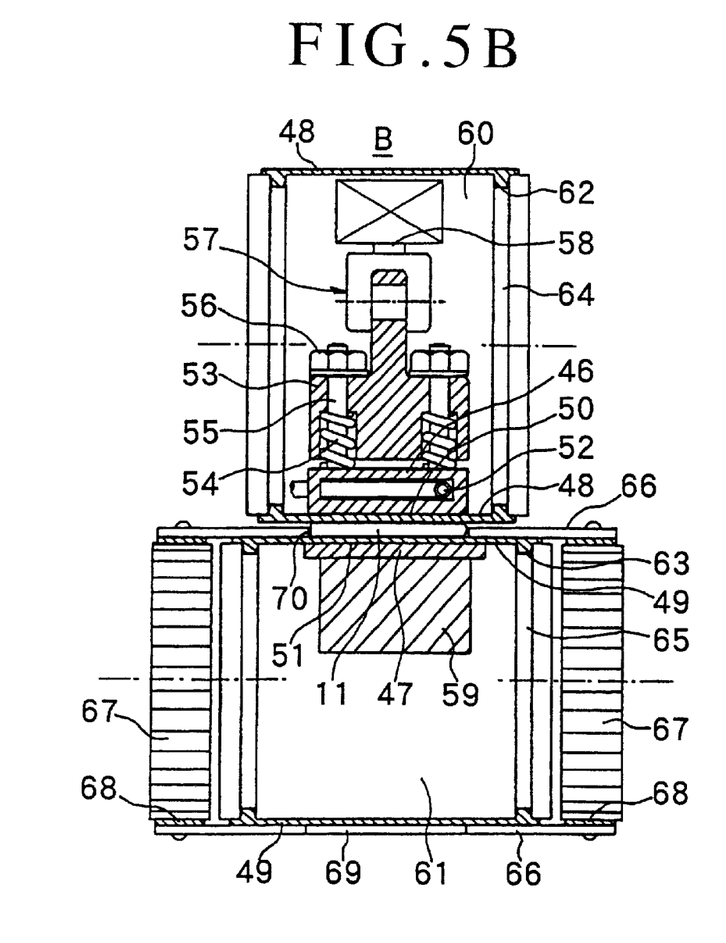
FIG. 5(B) is a front sectional view of the cool press device.

The cool press device B includes a cool press board 46 and a pressure receiving board 47 disposed in vertically opposed relationship, and an upper belt 48 and a lower belt 49 disposed between opposing surfaces of the cool press board 46 and the pressure receiving board 47.

It further includes booklet transfer mechanism interposed between opposing surfaces of the upper and lower belts 48, 49 and adapted to intermittently transfer an identification booklet 11 in its closed state.

The upper and lower belts 48, 49 and the identification booklet 11 interposed between the upper and lower belts 48, 49 are cooled while being held under pressure between the opposing surfaces of the cool press board 46 and the pressure receiving board 47 so that a protective film 6 bound into the identification booklet 11 is thermally adhered to a personal data recording surface 5 of the identification booklet 11 when the book transfer mechanism stops transfering of the identification booklet 11.

As described above, the identification booklet 11 is cool pressed in its closed state, and the protective film 6 is cooled by heat (i.e. heat transfer with) from the cool press board 46 through the upper belt 48 and a back cover 19.

The upper and lower belts 48, 49 retain the heat from the cool press board 46 and apply the heat to the protective film 6 from the outer surface side of the back cover 19 and the front cover 18.

The cool press board 46 and the pressure receiving board 47 are made of metal. Opposing surfaces of the cool press board 46 and the pressure receiving board 47, i.e., a pressing surface 50 of the cool press board 46 and a pressure receiving surface 51 of the pressure receiving board 47 are in the form of a flattened surface, and the pressing surface 50 and the pressure receiving surface 51 are in opposed parallel relationship.

Figure 8:
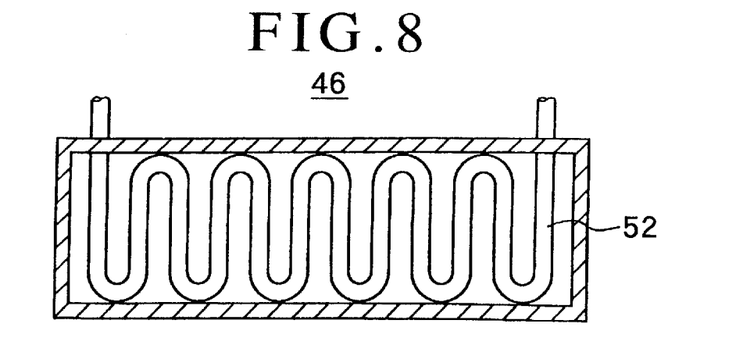
FIG. 8 is a top sectional view of a cool press board.

The cool press board 46 and the pressure receiving board 47 are dimensioned in length as being capable of cool pressing a plurality of identification booklets 11 at a time. The cool press board 46 is provided therein with cooling pipes 52 sinusoidally wired in a longitudinal direction (transferring direction) thereof. The cooling pipes 52 can be inserted and withdrawn sideways of the cool press board 46.

The cool press board 46 is disposed on a lower surface side of an upper base 53 through a cushion spring 54. For example, the cushion spring 54 is interposed between the cool press board 46 and the upper base 53, and a suspension bar 55 provided on the cool press board 46 is inserted into the upper base 53 from a lower surface side thereof towards an upper surface side thereof. Then, a nut 56 is threadingly engaged with a male screw formed on one end portion of the suspension bar 55 projecting from the upper surface side of the upper base 53 and tightened together, so that the cushion spring 54 is suspended in its compressed state. Accordingly, a repulsive force of the cushion spring 54 is normally exerted to the cool press board 46. This makes it possible for the cool press board 46 to resiliently move upwardly and downwardly.

It is also an interesting arrangement that the upper base 53 is suspended on an air cylinder 58 through a link 57, so that the cool press board 46 can be moved upwardly and downwardly together with the upper base 53 in accordance with expansion and contraction of the air cylinder 58.

On the other hand, the pressure receiving board 47 is fixedly attached onto the lower base 59 with the upper belt 48 and the lower belt 49 extending between the opposing surfaces of the cool press board 46 and the pressure receiving board 47.

The upper and lower belts 48, 49 are belts with ends or endless belts as illustrated. The upper belt 48 formed of an endless belt is disposed between upper rollers 60 which are arranged on an inlet side end portion and an outlet side end portion of the cool press board 46 in such a manner as to surround the cool press board 46. Similarly, the lower belt 49 formed of an endless belt is disposed between lower rollers 61 which are arranged on an inlet side end portion and an outlet side end portion of the pressure receiving board 47 in such a manner as to surround the pressure receiving board 47.

Between the upper and lower rollers 60, 61, the upper and lower belts 48, 49 extend in parallel relation between the opposing surfaces of the cool press board 46 and the pressure receiving board 47. That is, the upper belt 48 extends along the pressing surface 50 of the cool press board 46, and the lower belt 49 extends along the pressure receiving surface 51 of the pressure receiving board 47.

Preferably, the upper belt 48 and the lower belt 49 are formed of a thick fabric woven from Teflon fiber so that they may have sufficient strength, heat resisting properties and heat accumulating properties.

Annular belt guiding ribs 62, 63 are provided on inner surface sides of ear portions of the upper and lower belts 48, 49. The annular ribs 62, 63 are fitted into annular grooves 64, 65 formed in the upper and lower rollers 60, 61 in order to prevent the upper and lower belts 48, 49 from swaying sideways.

The upper and lower belts 48, 49 are intermittently advanced by actuating one of the upper rollers 60 and one of the lower rollers 61. The upper and lower belts 48, 49 and bar pushers 66 acting as means for intermittently transmitting the identification booklet 11 are intermittently driven generally in synchronism.

There is a provision of a booklet transfer mechanism for intermittently transferring the identification booklet 11 while interposing the identification booklet 11 between the upper and lower belts 48, 49.

Although not illustrated, there may be provided on the pressure receiving board 47 a binding width cooling board for cooling the binding width 8 of the protective film 6 at an outer surface portion of the front cover 18 adjacent to a spine 40 of the identification booklet 11, i.e., the area along the stitching portion from the opposite side of the cool press board 46 through the lower belt 49, in addition to a provision of the cool press board 46 for cooling the entire surface of the back cover 19 of the identification booklet 11 through the upper belt 48.

Accordingly, this binding width cooling board is placed opposite to a part of the cool press board 46 and operated to cool press the area along the stitching portion 4 of the identification booklet 11, i.e., the extension area of the binding width 8 while holding that area from above and under the identification booklet 11.

In order to apply such a cool pressing, the bar pushers 66 transfer the identification booklet 11 while pressing its bottom margin 38 or the top margin 39.

That is, the identification booklet 11 is pushed by the bar pushers 66 so as to be intermittently transferred with the top margin 39 or the bottom margin 38 extending in the direction orthogonal to the transferring direction of the identification booklet 11 and with the spine 40 and the front edge 41 extending in the transferring direction, and pressed and cooled by the cool press device B.

The bar pushers 66 are the same in construction as those in the heat press device A. Therefore, with respect to the construction of the bar pushers 66 in the cool press device B, reference should be made to the corresponding description with respect to the bar pushers 36 in the heat press device A. In that case, the pulleys 67 correspond to the pulleys 45, the timing belt 68 to the timing belt 44, the recesses 69, 70 to the recesses 42, 43, the lower rollers 61 to the lower rollers 31, and the lower belt 49 to the lower belt 15, respectively.

The identification booklet 11 is intermittently transferred by being pushed by the bar pushers 36 while being interposed between the upper and lower belts 14, 15 when the identification booklet 11 is in its closed state. When the upper and lower belts 14, 15 and the bar pushers 36 are in stopped position, the heat press board 12 is lowered to heat press the identification booklet between the heat press board 12 and the pressure receiving board 13.

The heat press board 12 and the pressure receiving board 13 are so dimensioned in length as to be capable of pressing a plurality of identification booklets 11 at a time. Each of the identification booklets 11 is repeatedly subjected to heat pressing operation and releasing operation during the time each of the identification booklets 11 passes between the heat press board 12 and the pressure receiving board 13.

By this, the protective film is firmly adhered to the personal data recording surface 5. At the same time, the binding width 8 is thermally adhered to the area along the throat portion of the data sheet 1 between the heat press board 12 and the binding width heating hot plate 37.

The binding width heating hot plate 37 is adapted to ensure the adhesion of the binding width 8. The present invention includes a case where there is no provision of the hot plate 37 and the binding width 8 is adhered only by the heat of the heat press board 12.

It is preferred that a plurality units of the heat press devices A are continuously lined up and the cool press device B is disposed on the outlet end side of the rear heat press device A.

The identification booklet 11 coming out of the outlet end of the heat press device A is pushed by the bar pushers 66 while maintaining its closed state and intermittently transferred while being interposed between the upper and lower belts 48, 49. When the upper and lower belts 48, 49 and the bar pushers 66 are in stopped position, the cool press board 46 is lowered to cool press the identification booklet 11 between the cool press board 46 and the pressure receiving board 47.

The cool press board 46 and the pressure receiving board 47 are so dimensioned in length as to be capable of pressing a plurality of identification booklets 11 at a time. Each of the identification booklets 11 is repeatedly subjected to cool pressing operation and releasing operation during the time each of the identification booklets 11 passes between the cool press board 46 and the pressure receiving board 47.

By this, the protective film 6 firmly adhered to the personal data recording surface 5 and its adhering surface are cooled and hardened in their pressed states. At the same time, the binding width 8 and the adhering surface thermally adhered to the area along the throat portion of the data sheet 1 are cooled and hardened in their pressed states between the cool press board 46 and the pressure receiving board 47.

By this, the identification booklet 11 as a whole made flat to facilitate the adhesion of the protective film 6.

According to the present invention, the protective film bound into the identification booklet is subjected to a heat pressing operation through the upper and lower belts and the front cover of the identification booklet. Accordingly, the protective film can positively be adhered to the personal data recording surface and the identification booklet as a whole can be made flat. This makes it possible to effectively eliminate inconveniences inherent in the prior art devices, such as the protective film becoming curled, the data sheets becoming irregular and the protective film being displaced such that the production yield of the identification booklet can be extensively increased. This effect is further enhanced by cooperative operation of the heat press device A and the cool press device B.

Also, by virtue of the above-mentioned construction of the bar pushers, the work for intermittently transferring the identification booklet while interposing the identification booklet between the upper and lower belts and the heat pressing operation can be carried out in a correct manner.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What is claimed is:

1. A device for adhering a protective film to a personal data recording surface of an individual identification booklet, comprising a heat press board and a pressure receiving board disposed in vertically opposed relationship, an upper and a lower belt disposed between opposing surfaces of said heat press board and said pressure receiving board, and a booklet transfer mechanism interposed between opposing surfaces of said upper and lower belts and adapted to intermittently transfer an identification booklet, said upper and lower belts and the identification booklet interposed between said upper and lower belts being heated while being held under pressure between said opposing surfaces of said heat press board and said pressure receiving board so that the protective film bound into the identification booklet is thermally adhered to the personal date recording surface when said book transfer mechanism stops transferring of the identification booklet, wherein said booklet transfer mechanism comprises a plurality of bar pushers extending in a direction orthogonal to the booklet transferring direction and spacedly juxtaposed in the booklet transferring direction, and said bar pushers are arranged such that each of said bar pushers pushes a rear end face of the identification booklet to transfer the identification booklet while being interposed between said upper and lower belts.

2. A device for adhering a protective film to a personal data recording surface of an individual identification booklet according to claim 1, wherein each of said bar pushers has a flattened configuration capable of pushing a rear end face of the identification booklet at a level not exceeding a thickness of the identification booklet.

3. A device for adhering a protective film to a personal data recording surface of an individual identification booklet according to claim 1, wherein each of said bar pushers for pushing a rear end face of the identification booklet includes a recess for receiving therein a rear end of the identification booklet.

4. A device for adhering a protective film to a personal data recording surface of an individual identification booklet according to claim 1, wherein a rearward bar pusher of said bar pushers, which are adjacent forwardly and rearwardly, pushes a rear end face of the identification booklet and a forward bar pusher restricts a forward end face of the identification booklet.

5. A device for adhering a protective film to a personal data recording surface of an individual identification booklet according to claim 4, wherein said rearward bar pusher includes a recess for receiving therein a rear end of the identification booklet and said forward bar pusher includes a recess for receiving therein a forward end face of the identification booklet.

6. A device for adhering a protective film to a personal data recording surface of an individual identification booklet according to claim 1, wherein each of said bar pushers is formed by blanking a plate such that a rear end face of the identification booklet is pushed by a thickness-wise surface of said plate.

7. A device for adhering a protective film to a personal data recording surface of an individual identification booklet according to claim 1, wherein each of said bar pushers pushes a top edge or a bottom edge of the identification booklet.

8. A device for adhering a protective film to a personal data recording surface of an individual identification booklet, comprising a heat press board and a pressure receiving board disposed in vertically opposed relationship, an upper and a lower belt disposed between opposing surfaces of said heat press board and said pressure receiving board, and a booklet transfer mechanism interposed between opposing surfaces of said upper and lower belts and adapted to intermittently transfer an identification booklet, said upper and lower belts and the identification booklet interposed between said upper and lower belts being heated while being held under pressure between said opposing surfaces of said heat press board and said pressure receiving board so that the protective film bound into the identification booklet is thermally adhered to the personal date recording surface when said book transfer mechanism stops transferring of the identification booklet, wherein said heat press board and said pressure receiving board constitute a heat press device, and a cool press device for holding under pressure the identification booklet in order to cool the protective film and an adhering surface thereof is disposed on an outlet side of said heat press device, and wherein said booklet transfer mechanism comprises a plurality of bar pushers extending in a direction orthogonal to the booklet transferring direction and spacedly juxtaposed in the booklet transferring direction, and said bar pushers are arranged such that each of said bar pushers pushes a rear end face of the identification booklet to transfer the identification booklet while being interposed between said upper and lower belts.

9. A device for adhering a protective film to a personal data recording surface of an individual identification booklet, comprising a heat press board and a pressure receiving board disposed in vertically opposed relationship, and upper and a lower belt disposed between opposing surfaces of said heat press board an said pressure receiving board, and a booklet transfer mechanism interposed between opposing surfaces of said upper and lower belts and adapted to intermittently transfer an identification booklet, said upper and lower belts and the identification booklet interposed between said upper and lower belts being heated while being held under pressure between said opposing surfaces of said heat press board and said pressure receiving board so that the protective film bound into the identification booklet is thermally adhered to the personal date recording surface when said book transfer mechanism stops transferring of the identification booklet, wherein said heat press board constitutes a hot plate for heating an entire surface of the identification booklet through said upper belt, and said pressure receiving board includes a hot plate for heating a surface portion adjacent to a spine of the identification booklet through said lower belt, wherein said booklet transfer mechanism comprises a plurality of bar pushers extending in a direction orthogonal to the booklet transferring direction and spacedly juxtaposed in the booklet transferring direction, and said bar pushers are arranged such that each of said bar pushers pushes a rear end face of the identification booklet to transfer the identification booklet while being interposed between said upper and lower belts.

10. A device for adhering a protective film to a personal data recording surface of an individual identification booklet according to claim 2, wherein each of said bar pushers for pushing a rear end face of the identification booklet includes a recess for receiving therein a rear end of the identification booklet.

11. A device for adhering a protective film to a personal data recording surface of an individual identification booklet according to claim 2, wherein a rearward bar pusher of said bar pushers, which are adjacent forwardly and rearwardly, pushes a rear end face of the identification booklet and a forward bar pusher restricts a forward end face of the identification booklet.

12. A device for adhering a protective film to a personal data recording surface of an individual identification booklet according to claim 3, wherein a rearward bar pusher of said bar pushers, which are adjacent forwardly and rearwardly pushes a rear end face of the identification booklet and a forward bar pusher restricts a forward end face of the identification booklet.

13. A device for adhering a protective film to a personal data recording surface of an individual identification booklet according to claim 2, wherein each of said bar pushers is formed by blanking a plate such that a rear end face of the identification booklet is pushed by a thickness-wise surface of said plate.

14. A device for adhering a protective film to a personal data recording surface of an individual identification booklet according to claim 3, wherein each of said bar pushers is formed by blanking a plate such that a rear end face of the identification booklet is pushed by a thickness-wise surface of said plate.

15. A device for adhering a protective film to a personal data recording surface of an individual identification booklet according to claim 4, wherein each of said bar pushers is formed by blanking a plate such that a rear end face of the identification booklet is pushed by a thickness-wise surface of said plate.

16. A device for adhering a protective film to a personal data recording surface of an individual identification booklet according to claim 5, wherein each of said bar pushers is formed by blanking a plate such that a rear end face of the identification booklet is pushed by a thickness-wise surface of said plate.

17. A device for adhering a protective film to a personal data recording subrace of an individual identification booklet according to claim 2, wherein each of said bar pushers pushes a top edge or a bottom edge of the identification booklet.

18. A device for adhering a protective film to a personal data recording subrace of an individual identification booklet according to claim 3, wherein each of said bar pushers pushes a top edge or a bottom edge of the identification booklet.

19. A device for adhering a protective film to a personal data recording subrace of an individual identification booklet according to claim 4, wherein each of the bar pushers pushes a top edge or a bottom edge of said identification booklet.

20. A device for adhering a protective film to a personal data recording subrace of an individual identification booklet according to claim 5, wherein each of said bar pushers pushes a top edge or a bottom edge of the identification booklet.

21. A device for adhering a protective film to a personal data recording subrace of an individual identification booklet according to claim 6, wherein each of said bar pushers pushes a top edge or a bottom edge of the identification booklet.

* * * * *